US009980149B2

(12) United States Patent
Radunovic et al.

(10) Patent No.: US 9,980,149 B2
(45) Date of Patent: May 22, 2018

(54) DISTRIBUTED SELECTION OF WHITE SPACE CHANNELS

(71) Applicant: Microsoft Technology Licensing, LLC, Redmond, WA (US)

(72) Inventors: Bozidar Radunovic, Cambridge (GB); Thomas Karagiannis, Cambridge (GB); Dan A. Alistarh, Meyrin (CH); Ghufran Baig, Austin, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 15/010,756

(22) Filed: Jan. 29, 2016

(65) Prior Publication Data
US 2017/0223549 A1 Aug. 3, 2017

(51) Int. Cl.
*H04W 72/00* (2009.01)
*H04W 16/14* (2009.01)
*H04W 72/04* (2009.01)
*H04W 24/10* (2009.01)

(52) U.S. Cl.
CPC ........... *H04W 16/14* (2013.01); *H04W 24/10* (2013.01); *H04W 72/0453* (2013.01)

(58) Field of Classification Search
None
See application file for complete search history.

(56) References Cited

U.S. PATENT DOCUMENTS

| 2011/0250916 | A1 | 10/2011 | Li et al. |
| 2012/0058790 | A1 | 3/2012 | Junell et al. |
| 2014/0004872 | A1* | 1/2014 | Li ............... H04W 16/14 455/454 |
| 2014/0086194 | A1* | 3/2014 | Sugahara ....... H04W 28/16 370/329 |
| 2014/0128073 | A1 | 5/2014 | Farhadi |
| 2015/0043471 | A1* | 2/2015 | Rinne ............ H04L 5/0053 370/329 |
| 2015/0257155 | A1* | 9/2015 | Wijetunge ...... H04W 72/0453 370/329 |
| 2017/0034845 | A1* | 2/2017 | Liu ............... H04L 1/0003 |
| 2017/0094566 | A1* | 3/2017 | Yang ............. H04W 36/0061 |

OTHER PUBLICATIONS

Arslan,"FERMI: A Femtocell Resource Management System for Interference Mitigation in OFDMA Networks", MobiCom '11 Proceedings of the 17th annual international conference on Mobile computing and networking, Sep. 19, 2011, 12 pages.
"International Search Report and Written Opinion", Application No. PCT/US2017/014003, dated Apr. 11, 2017, 12 pages.

* cited by examiner

*Primary Examiner* — German J Viana Di Prisco

(57) ABSTRACT

Techniques for distributed selection of white space channels are described. According to one or more embodiments, techniques described herein enable fair allocation of available white spaces among entities seeking access to the white spaces, such as base stations and client devices in a particular geographical region. According to one or more embodiments, techniques for distributed selection of white space channels enable individual network components to detect white space network attributes and distribute white space channels based on the detected attributes. Alternatively or additionally, multiple base stations can collaborate to share information about white spaces in a particular region.

20 Claims, 9 Drawing Sheets

DISTRIBUTED SELECTION OF WHITE SPACE CHANNELS

BACKGROUND

Modern techniques for mobile communication provide users with the ability to communicate across a wide variety of different geographical areas. For example, wireless cellular networks have been deployed that provide cellular coverage in many different areas. Typically, cellular networks are deployed by cellular operators that are licensed to operate in a particular portion of the radio spectrum, and that leverage cellular base stations that are geographically distributed to provide wireless coverage.

While cellular services provided by these cellular operators provide their subscribers with convenient access to wireless communication, there remain portions of spectrum that are underutilized. For instance, "white spaces" represent portions of spectrum that are not specifically allocated for wireless service for a particular entity, and that may be used for various purposes. White spaces, along with other underutilized portions of radio spectrum, for example, may be used on an ad hoc basis for various types of wireless signal transmission. However, determining fair distribution of white spaces among different wireless devices seeking access presents a number of challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for distributed selection of white space channels are described. According to one or more embodiments, techniques described herein enable fair allocation of available white spaces among entities seeking access to the white spaces, such as base stations and client devices in a particular geographical region. According to one or more embodiments, techniques for distributed selection of white space channels enable individual network components to detect white space network attributes and distribute white space channels based on the detected attributes. Alternatively or additionally, multiple base stations can collaborate to share information about white spaces in a particular region.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
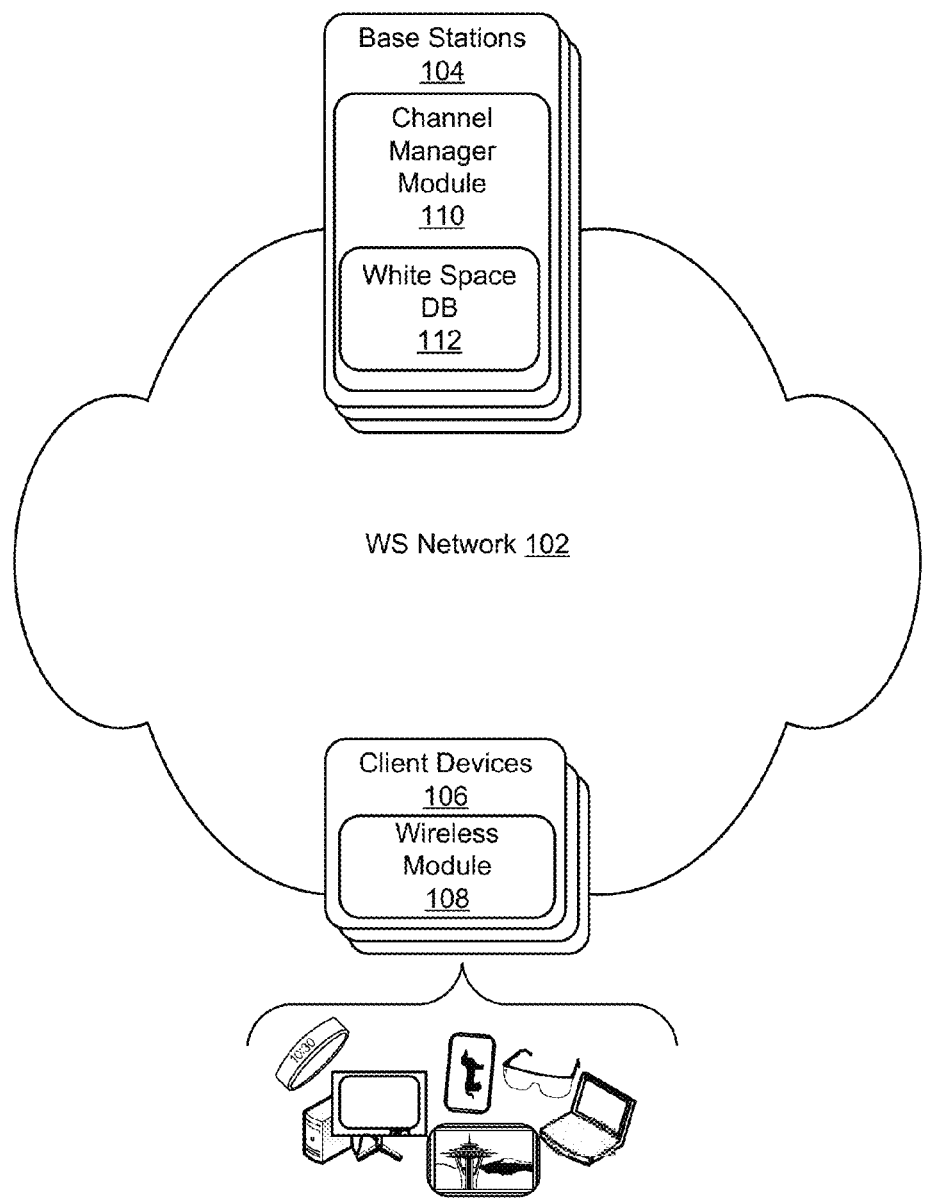
FIG. 1 is an illustration of an environment in an example implementation that is operable to employ techniques discussed herein.

Techniques for distributed selection of white space channels are described. Generally, "white spaces" represent portions of the radio frequency (RF) spectrum that are not specifically allocated and/or licensed for wireless service, and that may be used for various purposes. Accordingly, techniques described herein enable fair allocation of available white spaces among entities seeking access to the white spaces, such as base stations and client devices in a particular geographical region. Allocated white spaces may be used for various types of wireless communication, such as wireless cellular, wireless data transmission, wireless broadband (e.g., WiFi®), and so forth. In at least some implementations, techniques described herein are employed to provide wireless communication across white spaces according to a particular mobile telecommunications standard, such as Long Term Evolution (LTE), International Mobile Telecommunications-Advanced (IMT-Advanced), 5G, and so forth.

According to various implementations, techniques for distributed selection of white space channels enable individual network components to detect white space network attributes and distribute white space channels based on the detected attributes. For instance, a wireless base station (base station) can detect wireless transmission over white spaces from multiple devices. Based on the detected transmissions, the base station can determine its share of the white spaces and perform a distributed channel selection process that allocates the share of white spaces to devices that it services. Alternatively or additionally, multiple base stations can collaborate to share information about white spaces in a particular region, and thus increase the ability of the base stations to make accurate decisions regarding white space share and allocations. Generally, determining a share of white spaces considers devices that are serviced by a base station, as well as other devices that are not serviced by the base station. Thus, ways of determining white space share detailed below seek to fairly distribute available white spaces among all detected devices seeking access to the white spaces.

According to various implementations, different distributed channel selection processes can be employed to select and allocate channels from a calculated share. For instance, a "hopping" procedure is performed which determines channel quality across a share of available channels, and allocates selects channels that meet or exceed a threshold signal quality. Alternatively or additionally, a sequential allocation procedure is performed which randomly selects available white space channels, transmits data over the randomly selected channels, and selects channels that meet or exceed a threshold signal quality. Generally, either or both of these procedures can be performed iteratively until a share of white space channels is allocated.

Accordingly, techniques for distributed selection of white space channels described herein enable both a fair allocation of available white space channels, and a comprehensive utilization of available white space channels. Further, channel interference is reduced by allocating channels that meet a threshold signal quality, thus avoiding collisions between devices that may otherwise transmit over a same channel.

In the following discussion, an example environment is first described. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for distributed selection of white space channels described herein. Generally, the environment 100 includes various devices, services, and networks that enable communication via a variety of different modalities. For instance, the environment 100 includes a white space (WS) network 102, base stations 104, and client devices 106. Generally, the WS network 102 is representative of portions of the radio spectrum that are available for transmission of wireless signal. The WS network 102, for instance, represents unlicensed and/or unallocated portions of the radio spectrum. In at least some implementations, the WS network 102 may include licensed channels that are not currently in use, such as channels that have been licensed to a particular entity but in which service has not been deployed. Generally, the WS network 102 represents portions of RF spectrum in a particular geographical region.

The base stations 104 are representative of functionality for transmitting and receiving ("communicating") wireless signal over the WS network 102. For instance, the client devices 106 can communicate wireless signal via the base stations 104, such as for engaging in wireless communication. Examples of wireless communication include voice calls, video calls, multimedia communication sessions, web browsing, and so forth. In at least some implementations, the individual base stations 104 may be deployed and/or managed by different respective entities. For instance, a particular entity may deploy a single base station 104 to provide for wireless communication over the WS network 102 in a particular geographical area. The base stations 104 may provide for wireless connectivity within the WS network 102 via a variety of different cellular technologies, such as 3G, 4G (e.g., Long Term Evolution (LTE)), 5G, and so forth. At least some of the base stations 104, for instance, can be implemented as instances of an Evolved Node B (eNodeB) that provide wireless cellular service to one or more of the client devices 106.

In at least some implementations, the base stations 104 are connected (wired and/or wirelessly) to other network infrastructure components to enable wireless signal received from a particular client device 106 to be communicated to a different network, such as for forwarding to a device connected to the different network. Alternatively or additionally, the base stations 104 can directly broker communication between the different client devices 106.

The client devices 106 are representative of user endpoint devices that are configured to communicate wirelessly via the WS network 102. Generally, the client devices 106 may be configured in a variety of ways, such as a wireless cellular phone, a mobile station, an entertainment appliance, a wearable device, a game console, a handheld device (e.g., a tablet), a traditional computer (e.g., a desktop personal computer, laptop computer, and so on), and so forth.

The client devices 106 each include a wireless module 108, which is representative of functionality (i.e., hardware and logic) to enable the client devices 106 to communicate data wirelessly. For instance, leveraging the wireless module 108, an instance of the client devices 106 can exchange data wirelessly with the base stations 104 to enable communication with other client devices 106.

Further to techniques for distributed selection of white space channels discussed herein, the environment 100 includes a channel manager ("CM") module 110. Generally, the CM module 110 is representative of functionality to determine white space availability for the WS network 102, and to distribute available channels among the client devices 106. As depicted here, the CM module 110 may be deployed within the base stations 104. Alternatively or additionally, the CM module 110 may be deployed separately from the base stations 104, such as a remote service that is accessible to the base stations 104 to perform channel allocation for the WS network 102.

The CM module 110 includes and/or has access to a white space database (DB) 112, which is representative of functionality to track available white spaces in different geographical regions. For instance, the geographical region in which the WS network 102 resides includes both licensed and unlicensed/unallocated portions of spectrum. Thus, the white space DB 112 identifies which portions of spectrum are unlicensed and/or unallocated, and are thus available as white spaces for the WS network 102. For example, in allocating channels within the WS network 102 to the client devices 106, the CM module 110 ensures that allocated channels are constrained to those indicated as being available (e.g., unlicensed and/or unallocated) within the white space DB 112.

Having described an example environment in which the techniques described herein may operate, consider now some example implementation scenarios for distributed selection of white space channels in accordance with one or more embodiments.

Example Implementation Scenarios

The following section describes example implementation scenarios for distributed selection of white space channels in accordance with one or more implementations. The implementation scenarios may be implemented in the environment 100 discussed above, via the example system 900 discussed below, and/or any other suitable environment.

Figure 2:
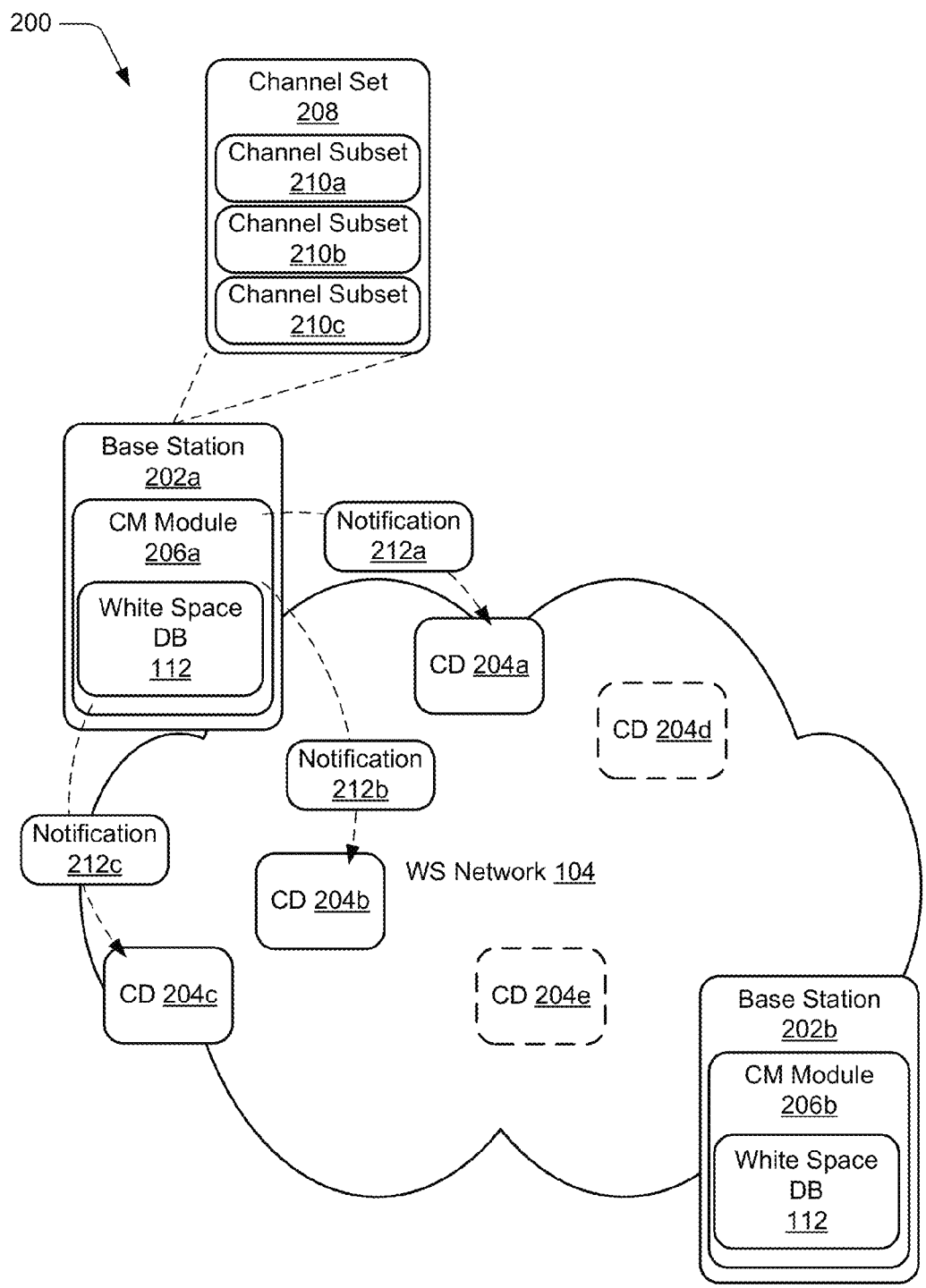
FIG. 2 illustrates an example implementation scenario for channel allocation in accordance with one or more embodiments.

FIG. 2 illustrates an example implementation scenario 200 for channel allocation in accordance with one or more implementations. The scenario 200 includes various types of entities and components introduced above with reference to the environment 100.

For instance, the scenario 200 includes a base station 202a and a base station 202b that are both deployed to utilize white spaces within the WS network 102. The base stations 202a, 202b may be deployed and managed by different entities, such as enterprise entities, government entities, educational entities, and so forth. Alternatively, the base stations 202a, 202b may be deployed and managed by the same entity to provide wireless service for different sets of client devices. Generally, the base stations 202a, 202b represent instances of the base stations 104 introduced above.

The scenario 200 further includes different instances of the client devices 106, including a client device (CD) 204a, a CD 204b, a CD 204c, a CD 204d, and a CD 204e. In this particular example, the CDs 204a-204c represent client devices that are wirelessly serviced by the base station 202a. For instance, the CDs 204a-204c are associated to the base station 202a and utilize the base station 202a to communicate wirelessly. Further, the CDs 204d, 204e represent client devices that are wirelessly serviced by the base station 202b.

Generally, the CDs 204a-204e represent client devices for which channels of the WS network 102 are to be allocated. For example, techniques for distributed selection of white space channels described herein seek to provide a fair distribution among devices seeking access to available channels. Thus, such techniques are leveraged to determine an aggregate demand for available channels, and to fairly allocate channels based on the demand.

To enable the base station 202a to allocate a fair share of channels to the CDs 204a-204c, a CM module 206a of the base station 202a first determines a total number of devices seeking access to the WS network 102. For instance, the CM module 206a detects that the CDs 204a-204e are seeking access to channels of the WS network 102. Generally, this detecting can be performed in various ways. In one particular example, the CM module 206a detects a different Physical Random Access Channel (PRACH) transmission (e.g., a PRACH preamble) from each of the CDs 204a-204c. Thus, the CM module 206a determines that there are five (5) total devices seeking access to channels in the WS network 102. Further, the CM module 206a knows that the CDs 204a-204c (three devices) are subscribers of the base station 202a, and thus the CM module 206a is responsible for allocating channels to the CDs 204a-204c. Accordingly, the CM module 206a determines that it is permitted to allocate ⅗ of the available channels in the WS network 102 to the CDs 204a-204c. This leaves the other ⅖ of the available channels for the CDs 204d, 204e.

In at least some implementations, the CM module 206a instructs the different CDs to send "keep alive" notifications on a period basis, such as every i seconds. For instance, the CM module 206a instructs each of the CDs 204a-204e to send a PRACH transmission every i seconds. This enables the CM module 206a to track which devices are still utilizing the WS network 102, and which devices are not. For instance, if the CM module 206a does not receive a PRACH transmission from a particular CD after a threshold period of time, the CM module 206a can remove the particular CD from its device count for purposes of channel share determination. Further, if the CM module 206a detects a new PRACH transmission from a previously undetected device, the CM module 206a can add the new device to its device count. Thus, share determination and channel allocation can be updated dynamically to account for changes in a number of devices present in the WS network 102.

Continuing with the scenario 200, the CM module 206a determines based on its ⅗ share that it is permitted to allocate a channel set 208 amongst the CDs 204a-204c. For instance, the channel set 208 represents ⅗ of the available channels in the WS network 102. The CM module 110, for example, determines a total number of available channels in the WS network 102 based on channel availability indicated in the white space DB 112. The CM module 110 then determines that ⅗ of the total number of channels are available to be allocated to the CDs 204a-204c. Example ways of calculating a share of channels are described below.

Starting with the channel set 208, the CM module 206a performs one or more channel allocation procedures to allocate a channel subset 210a to the CD 102a, a channel subset 210b to the CD 204b, and a channel subset 210c to the CD 204c. Each of the channel subsets 210a-210c represents different respective channels of the channel set 208. Example ways for allocating the channel subsets 210a-210c are presented in detail below. Generally, allocation of the channel subsets 210a-210c seeks to minimize interference with other channels being used in the WS network 102, such as channels being used by the base station 202b and/or the CDs 204d, 204e. Each channel in the channel subsets 210a-210c can be of any suitable size, such as from 180 kilohertz (kHz)-10 Megahertz (MHz). While implementations are discussed herein with reference to channel allocation, it is to be appreciated that the term "channel" may refer to one or both of a channel or a sub-channel.

The CM module 206a then communicates a notification 212a to the CD 204a identifying that the channel subset 210a is allocated to the CD 204a for wireless communication, a notification 212b to the CD 204b identifying that the channel subset 210b is allocated to the CD 204b for wireless communication, and a notification 212c to the CD 204c identifying that the channel subset 210c is allocated to the CD 204c for wireless communication. Generally, the notifications 212a-212c can be communicated to the respective CDs 204a-204c in various ways, such as via physical downlink control channel (PDCCH) from the base station 202a to the respective CDs 204a-204c. Accordingly, the CDs 204a-204c may utilize their respective channel subsets 210a-210c to communicate wirelessly over the WS network 102.

In at least some implementations, the CDs 204a-204c communicate channel quality indicator (CQI) reports to the base station 202a indicating channel quality on channels of their respective channel subsets 210a-210c. If a particular CQI report indicates that channel quality is below a threshold quality, the CM module 206a can perform a channel reallocation procedure to determine a new channel to replace the low quality channel. This process can be performed dynamically over time to enable for dynamic channel reallocation, such as to account for changes in channel quality and/or channel availability.

While the scenario 200 is discussed with reference to channel allocation by the base station 202a, it is to be appreciated that the base station 202b may perform a similar procedure to allocation its share of available channels to the CDs 204d, 204e. Further, while the scenario 200 is discussed with reference to a particular number of base stations and client devices, it is to be appreciated that techniques described herein can be employed to allocate and distribute channels utilizing any number of base stations and client devices.

According to various implementations, the CM module 206a determines channel availability and performs channel allocation without interacting with other network components, such as the base station 202b. For instance, the CM module 206a performs channel allocation based on its own detection of attributes of the WS network 102, such as detection of the number of client devices that are to be allocated channels and signal quality across the available channels. Alternatively or additionally, the CM module 206a may collaborate with one or more other components to enable various intelligence about the WS network 102 to be shared and used to allocate channels. Consider, the example, the following implementation scenario.

Figure 3:
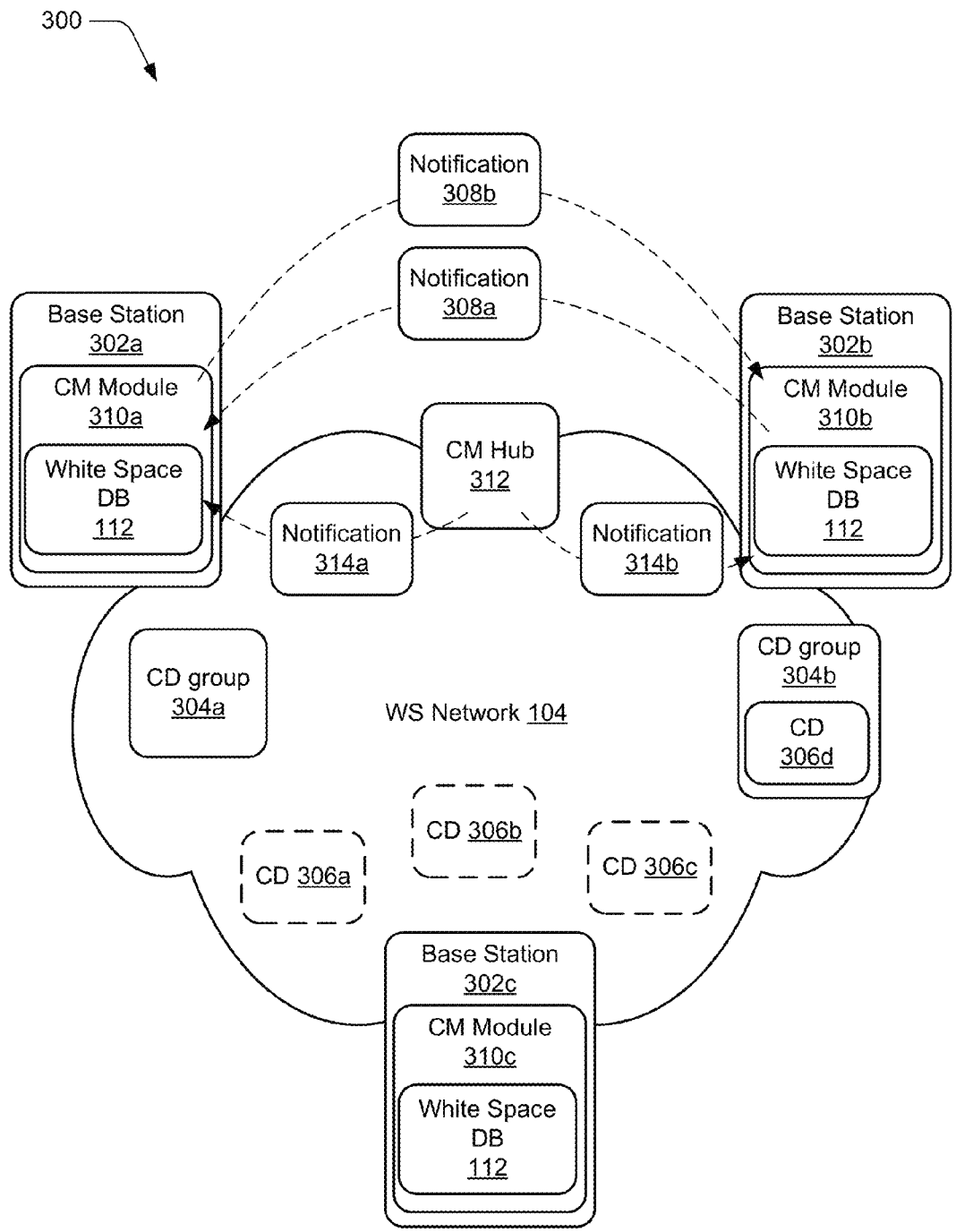
FIG. 3 illustrates an example implementation scenario for collaborative channel allocation in accordance with one or more embodiments.

FIG. 3 illustrates an example implementation scenario 300 for collaborative channel allocation in accordance with one or more implementations. The scenario 300 includes various types of entities and components introduced above with reference to the environment 100.

For instance, the scenario 300 includes a base station 302a, a base station 302b, and a base station 302c that are deployed to utilize white spaces within the WS network 102. Generally, the base stations 302a-302c represent instances of the base stations 104 introduced above.

In this particular example, the base stations 302a, 302b are communicatively coupled such that the base stations can share intelligence concerning the WS network 102 with one another. For instance, the base stations 302a, 302b have a wired and/or wireless connection with one another. In at least some implementations, the base stations 302a, 302b are deployed and/or managed by a common entity. The base station 302c, however, represents an independent base station that is not communicatively coupled to the base stations 302a, 302b. The base station 302c, for example, is deployed and/or managed by a different entity than the base stations 302a, 302b.

The base station 302a provides wireless connectivity to a client device (CD) group 304a, which represents a group of the client devices 106 that are wirelessly associated to the base station 302a. Further, the base station 302b provides wireless connectivity to a CD group 304b, which represents a group of the client devices 106 that are wirelessly associated to the base station 302b. The base station 302c provides wireless connectivity to a CD 306a, a CD 306b, and a CD 306c. Generally, the CDs 306a-306c represent instances of the client devices 106 that are wirelessly associated to the base station 302c.

As discussed above, the base stations 302a, 302b are configured to communicate various information with each other, such as various state information about the WS network 102. For instance, the base stations 302a, 302b are configured to share their respective views of the WS network 102 with each other, such as information about client devices that are detected by the respective base stations 302a, 302b. According to various implementations, this enables each of the base stations 302a, 302b to make more intelligent decisions regarding channel availability and channel allocation to their respective client devices.

For example, consider that the base station 302a detects the presence of some but not all of the client devices of the CD group 304b. The base station 302a, for instance, does not detect the presence of a CD 306d of the CD group 304b. Further, the base station 302a detects the CDs 306a, 306b, but not the CD 306c. The base station 302b, however, does detect the CD 306c. Generally, client device detection can be performed in various ways, such as via PRACH messages detected from individual client devices.

Further to the scenario 300, the base station 302b communicates a notification 308a to the base station 302a that identifies the individual client devices of the CD group 304b (including the CD 306d) and the CD 306c. Thus, a CM module 310a of the base station 302a detects the additional CDs 306c, 306d and considers these client devices, along with the other client devices of which the CM module 310a was previously aware, in determining a number of devices seeking access to channels of the WS network 102. The CM module 310a, for instance, considers these additional devices in determining a share of channels that it is permitted to allocate to its CD group 304a. For example, consideration of the additional devices CD 306c, 306d reduces the channel share that the base station 302a is permitted to allocate to the CD group 304a, since more devices than were previously known (i.e., prior to the notification 308a) to the CM module 310a are seeking access to channels. Thus, a more balanced allocation of channels to devices in the WS network 102 is realized. Ways of allocating channels are detailed elsewhere herein.

Continuing with the scenario 300, the base station 302a communicates a notification 308b to the base station 302b that identifies client devices that the base station 302a detects. In at least some implementations, this includes one or more client devices that the base station 302b does not directly detect, e.g., absent information from the notification 308b. Accordingly, a CM module 302b of the base station 302b may adjust (e.g., reduce) a number of channels that it allocates to the CD group 304b.

In addition to sharing information identifying devices detected by each of the base stations, the base stations 302a, 302b may share other information, such as channel quality observed for different channels in the WS network 102, channels being used by client devices 106 associated to the respective base stations 302a, 302b, and so forth. For instance, the notification 308b from the base station 302a to the base station 302b may also include channel quality information observed by the base station 302a, such as CQI reports for different channels of the WS network 102. Additionally, the notification 308b may identify channels being used by client devices of the CD group 304a. Accordingly, the CM module 310b of the base station 302b may adjust its channel selection for the CD group 304b, such as to avoid channels that are identified in the notification 308a as having poor quality and/or as being used by the CD group 304a. Similarly, the notification 308a from the base station 302b to the base station 302a may include such information to enable the CM module 310a to adjust its channel allocation accordingly.

As mentioned above, the base station 302c is not configured to communicate information directly with the base stations 302a, 302b. Thus, the base station 302c determines its share of channels based on client devices that it directly detects, such as discussed above with reference to the base station 202a of FIG. 2. For instance, a CM module 310c of the base station 302c determines a total number of devices to which channels are to be allocated based on PRACH messages detected from its own CDS 306a-306c, as well at least some client devices of the CD groups 304a, 304b. In at least some implementations, the base station 302c may not detect one or more client devices of the CD groups 304a, 304b, and thus may underestimate a number of devices seeking access to channels.

The scenario 300 also includes a channel manager (CM) hub 312, which represents an optional feature that can be leveraged to propagate intelligence about the WS network 102 to the base stations 302a, 302b. For instance, alternatively or additionally to directly communicating with each other, the base stations 302a, 302b can communicate their knowledge of the WS network 102 to the CM hub 312. As an example, information described with reference to the notifications 308a, 308b can be communicated from the base stations 302a, 302b to the CM hub 312. The CM hub 312 then compiles and sorts the information, and communicates pertinent information to the respective base stations 302a, 302b. For instance, a notification 314a from the CM hub 312 to the base station 302a includes information received at the CM hub 312 from the base station 302b, such as information described with reference to the notification 308b. Further, a notification 314b includes information received from the CM hub 312 to the base station 302b includes information received at the CM hub 312 from the base station 302a, such as information described with reference to the notification 308a. Using the information from their respective notifications, the CM modules 310a, 310b can adjust their channel allocation such as to increase quality of experience for their client devices, and avoid interference with their devices.

Accordingly, the scenario 300 illustrates that in at least some implementations, multiple base stations may collaborate to share information to enable more intelligent decisions regarding channel allocation.

In at least some implementations, aspects of the scenarios 200, 300 may be performed dynamically and/or periodically while wireless communications are in progress. For instance, the various notifications discussed in the scenarios 200, 300 may be communicated dynamically and/or in response to various events, such as changes in channel quality, changes in channel usage, and so forth. Such intelligence regarding channel conditions can be leveraged in various ways, such as for optimizing device performance (e.g., signal/noise ratio, battery life, and so on), optimizing wireless quality of experience, mitigating errors that occur and/or may occur during wireless communications, and so forth.

Having discussed some example implementation scenarios, consider now a discussion of some example procedures in accordance with one or more embodiments.

Example Procedures

The following discussion describes some example procedures for distributed selection of white space channels in accordance with one or more embodiments. The example procedures may be employed in the environment 100 of FIG. 1, the system 900 of FIG. 9, and/or any other suitable environment. The procedures, for instance, represent example procedures for implementing the implementation scenarios described above. Steps of the procedures may be performed by a CM module 110 of a particular base station 104, by the CM hub 312, and/or via cooperation between a CM module 110 and the CM hub 312. In at least some implementations, the steps described for the various procedures can be implemented automatically and independent of user interaction.

Figure 4:
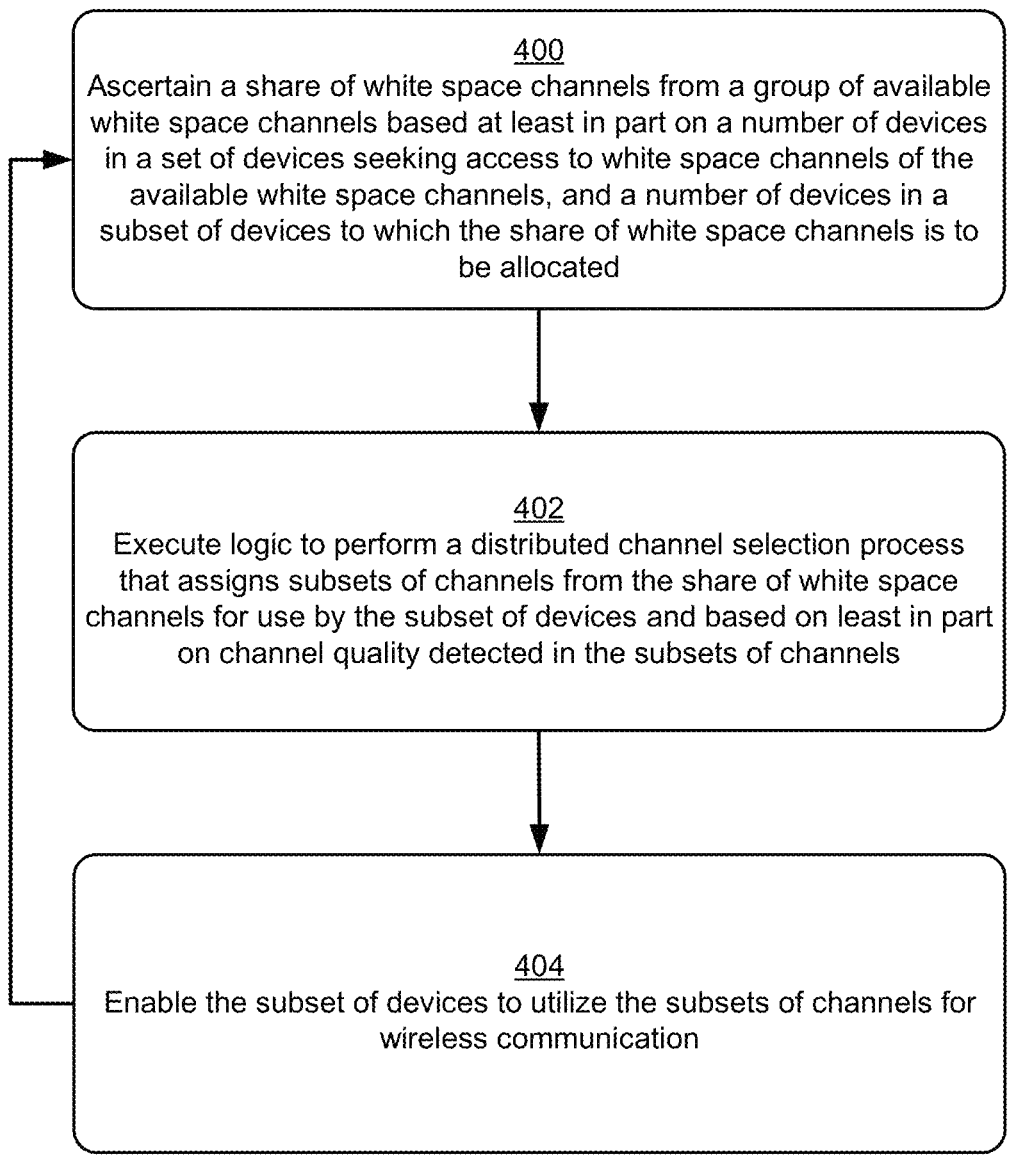
FIG. 4 is a flow diagram that describes steps in a method for selecting channels for wireless communication from available white space channels in accordance with one or more embodiments.

FIG. 4 is a flow diagram that describes steps in a method in accordance with one or more implementations. The method describes an example procedure for selecting channels for wireless communication from available white space channels in accordance with one or more implementations.

Step 400 ascertains a share of white space channels from a group of available white space channels based at least in part on a number of devices in a set of devices seeking access to space channels of the available white space channels, and a number of devices in a subset of devices to which the share of white space channels is to be allocated. For instance, with reference to the scenario 200 discussed above, the CM module 206a determines its share of channels (e.g., the channel set 208) in the WS network 102 based on a number of devices that are seeking access to the WS network 102, and a number of devices to which the base station 202a provides wireless connectivity. As mentioned above, one example way of determining a number of devices seeking access to white space channels is via detection of PRACH information transmitted from each of the devices. For instance, each PRACH message includes identification information that enables the devices to be differentiated from one another.

The following is an example formula for calculating a share of white space channels:

$$\text{Share} = \frac{NA}{NR}(\text{Available Channels}) \quad \text{Equation 1}$$

In this equation, NA is the number of devices to which a base station provides wireless service, NR is the total number of devices detected by the base station that are seeking access to white space channels, and Available Channels is the total number of white space channels determined to be available. In at least some implementations, Available Channels is determined from a white space database that indicates white space availability at a particular location.

Step 402 executes logic to perform a distributed channel selection process that assigns subsets of channels from the share of white space channels for use by the subset of devices and based on least in part on channel quality detected in the subsets of channels. For instance, with reference to the scenario 200 discussed above, the CM module 206a receives channel quality information from the CDs 204a-204c, selects channels that exceed a signal quality threshold from its determined share (e.g., the channel set 208), and allocates the channels among the devices to which it provides wireless service. Generally, the distributed channel selection process can be implemented in various ways, examples of which are described below.

Step 404 enables the subset of devices to utilize the subsets of channels for wireless communication. For instance, a base station 104 notifies different client devices 106 of particular channels that are assigned to the client devices 106. Accordingly, the client devices 106 utilize their respective allocated channels to engage in wireless communication. For instance, the client devices 106 transmit and receive wireless signal over their respective channels with a particular base station 104. Generally, transmitting and receiving wireless signal can be utilized for various types of communication, such as a cellular voice call, a multimedia communication session, an exchange of content, and so forth.

As depicted by the arrow returning to step 400, the process of FIG. 4 can be performed dynamically and/or periodically to ascertain a share of available channels. For instance, values for NA and NR discussed above may change, such as in response to client devices 106 leaving the WS network 102, and new client devices 106 entering the WS network 102 and requesting access to channels. In at least some implementations, the share calculation of step 400 is performed every s milliseconds to maintain an accurate count of devices to which a base station provides wireless service, and a total number of devices detected by the base station that are seeking access to white space channels.

Figure 5:
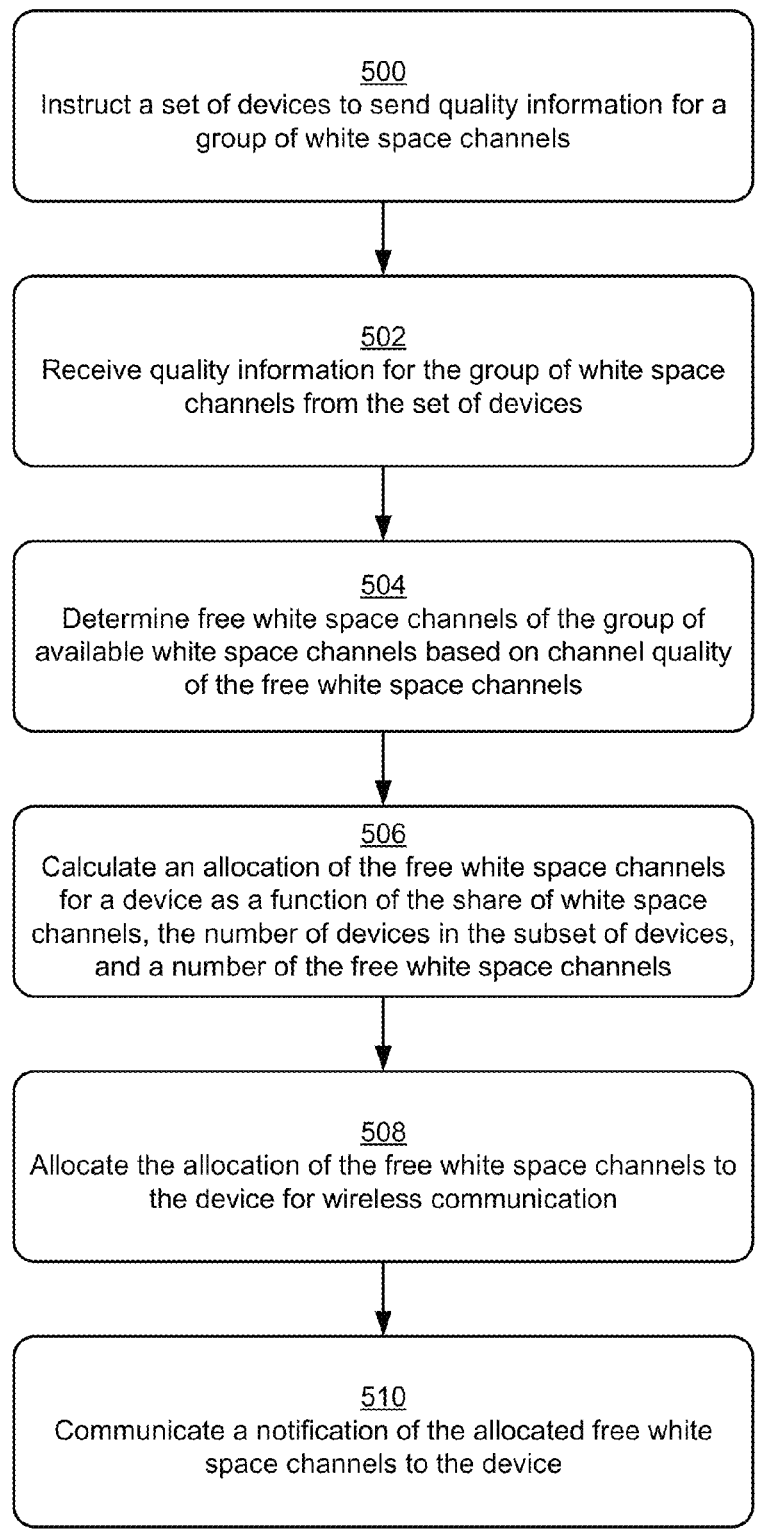
FIG. 5 is a flow diagram that describes steps in a method for a distributed channel selection process in accordance with one or more embodiments.

FIG. 5 is a flow diagram that describes steps in a method in accordance with one or more implementations. The method describes an example distributed channel selection process in accordance with one or more implementations. The method, for instance, represents an example implementation of step 402 discussed above with reference to FIG. 4.

Step 500 instructs a set of devices to send quality information for a group of white space channels. For instance, a CM module 110 instructs the devices that it services to send CQI reports to its base station 104 indicating channel quality detected by the devices in available white space channels of the WS network 102. In at least some implementations, the CM module 110 requests quality information for particular portions of RF spectrum, such as particular frequencies and/or frequency ranges. Further, the CM module 110 may instruct the devices to send the quality information on a periodic basis, such as every n seconds.

Step 502 receives quality information for the group of white space channels from the set of devices. With reference to the scenario 200, for instance, the CM module 206a receives the quality information (e.g., CQI reports) from the CDs 204a-204c. Generally, the quality information specifies signal quality detected in the set of channels, such for particular frequencies and/or frequency ranges. Signal quality can be specified in various ways, such as in terms of optimal modulation and coding scheme (implied by LTE CQI index), signal-to-noise ratio, packet error rate, packet loss rate, mean opinion score (MOS), and so forth.

Step 504 determines free white space channels of the group of available white space channels based on channel quality of the free white space channels. For instance, free white space channels represent channels that meet or exceed a threshold signal quality. According to various implementations, the threshold signal quality may be fixed or dynamically tracked and/or updated over time. One example way of determining free white space channels is discussed below.

Step 506 calculates an allocation of the free white space channels for a device as a function of the share of white space channels, the number of devices in the subset of devices, and a number of the free white space channels. The following equation provides one example way of calculating such an allocation:

$$\text{allocation} = \min\left(\frac{\text{share}}{NA}, \text{free channels}\right) \quad \text{Equation 2}$$

In this equation, min refers to a minimization function, share refers to the share calculated in Equation 1, NA is the number of devices to which a base station provides wireless service, and free channels is the number of free white space channels. Thus, a number of channels to be allocated to a particular device is calculated. Generally, using a minimization function ensures that in case the calculated share is overestimated, the actual allocation is reduced to mitigate a possible over-allocation of white space channels.

Step 508 allocates the allocation of the free white space channels to the device for wireless communication. For instance, a number of channels calculated as allocation are randomly selected from the channels determined to be free white space channels.

Step 510 communicates a notification of the allocated free white space channels to the device. A base station 104 that provides wireless service to the device, for instance, communicates a notification that identifies the channels to the device, such as in terms of frequencies and/or frequency ranges. Thus, the device may utilize the allocated channels to engage in wireless communication.

According to various implementations, this procedure can be iteratively performed until all devices to which a base station provides wireless service (e.g., NA) have been allocated channels and/or all of the base station's share of channels have been allocated.

Figure 6:
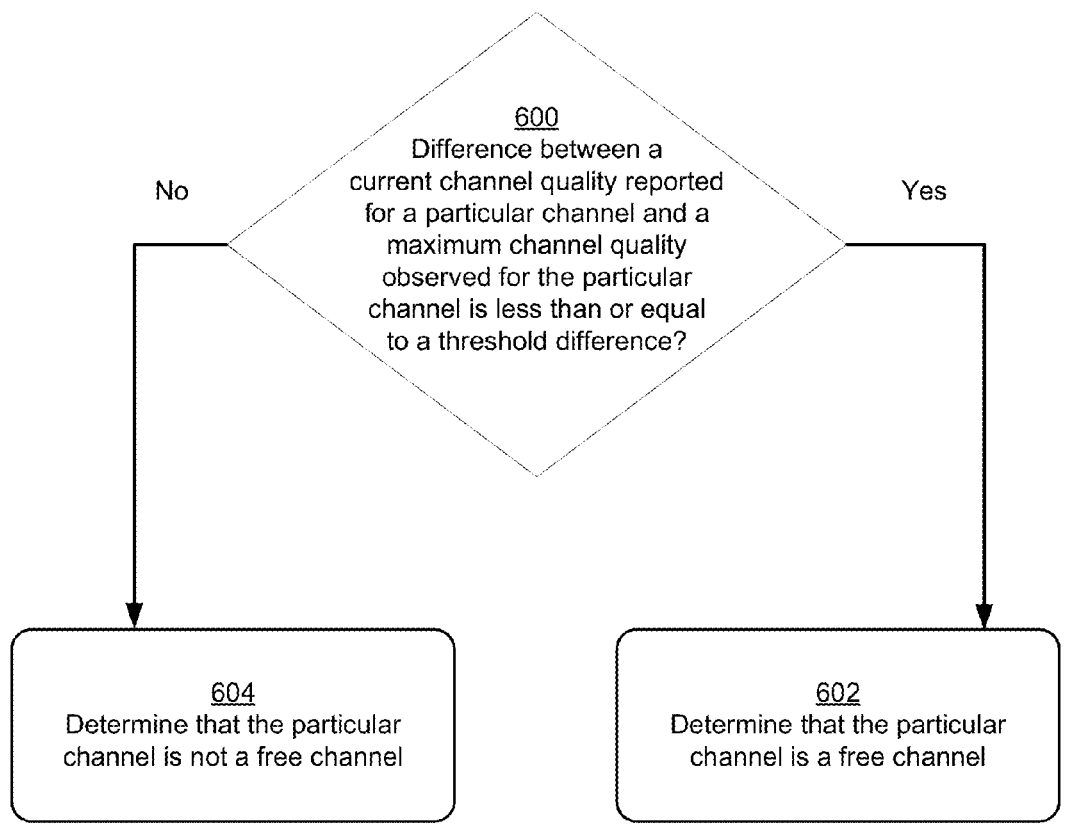
FIG. 6 is a flow diagram that describes steps in a method for determining whether a white space channel is free in accordance with one or more embodiments.

FIG. 6 is a flow diagram that describes steps in a method in accordance with one or more implementations. The method describes an example way of determining whether a white space channel is free in accordance with one or more implementations. The method, for instance, represents an example implementation of step 504 discussed above with reference to FIG. 5.

Step 600 ascertains whether a difference between a current channel quality reported for a particular channel and a maximum channel quality observed for the particular channel is less than or equal to a threshold difference. Generally, the current channel quality and maximum channel quality are received at a base station 104 from a particular client device 106 associated to the base station 104. The following equation provides one example way of determining whether a channel is a free channel:

$$\text{maxquality} - \text{reportedquality} \leq \alpha \quad \text{Equation 3}$$

In this equation, maxquality refers to a maximum signal quality observed for a channel, reportedquality refers to a most recent quality observed for a channel, and $\alpha$ refers to a threshold difference. Generally, signal quality may be characterized in various ways, examples of which are discussed above.

If the difference between the current channel quality reported for the particular channel and the maximum channel quality observed for the particular channel is less than or equal to the threshold difference ("Yes"), step 602 determines that the particular channel is a free channel. Accordingly, the particular channel may then be allocated for use by a particular device.

If the difference between the current channel quality reported for the particular channel and the maximum channel quality observed for the particular channel is not less than or equal to the threshold difference ("No"), step 604 determines that the particular channel is not a free channel. Accordingly, the particular channel is not considered for allocation for use by a particular device.

According to various implementations, after a channel is determined to be free and is assigned to a particular device, quality of the channel is tracked via subsequent quality reports from the particular device. If the quality at some point is determined to fall below a threshold quality, the channel is replaced with a new channel identified as an available free channel. For instance, consider the following procedure.

Figure 7:
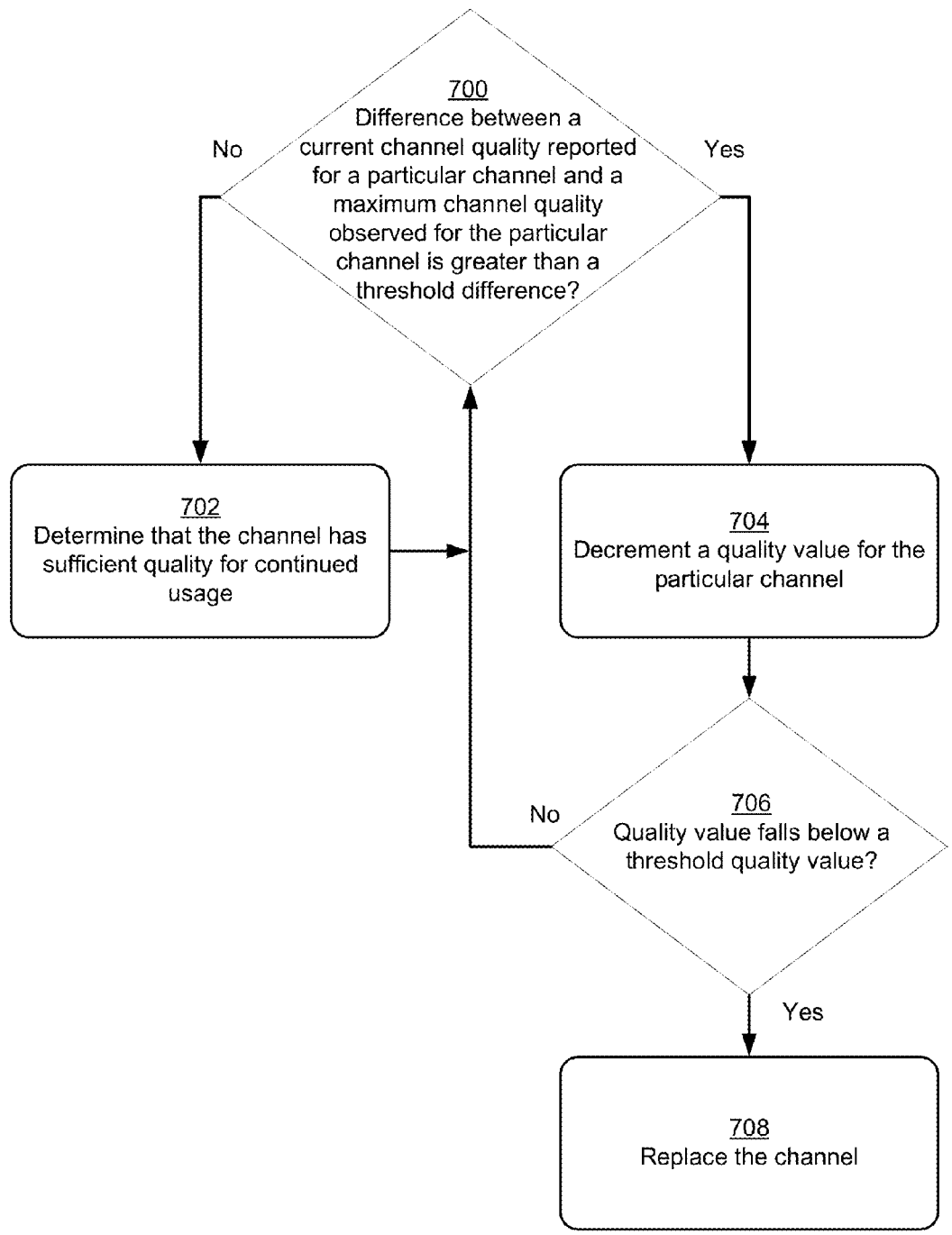
FIG. 7 is a flow diagram that describes steps in a method for determining whether to continue to use a white space channel currently in use in accordance with one or more embodiments.

FIG. 7 is a flow diagram that describes steps in a method in accordance with one or more implementations. The method describes an example way of determining whether to continue to use a white space channel currently in use in accordance with one or more implementations. The method, for instance, describes an example extension and/or variation of the methods described above and below.

Step 700 ascertains whether a difference between a current channel quality reported for a particular channel and a maximum channel quality observed for the particular channel is greater than a threshold difference. Generally, the current channel quality and maximum channel quality are received at a base station 104 from a particular client device 106 associated to the base station 104, and after the particular channel has been determined to be a free channel and assigned to the particular device. The following equation provides one example way of determining whether quality for a channel is greater than a threshold difference:

$$\text{maxquality} - \text{reportedquality} > \alpha \qquad \text{Equation 4}$$

In this equation, maxquality refers to a maximum signal quality observed for the particular channel, reportedquality refers to a most recent quality observed for the particular channel, and $\alpha$ refers to a threshold difference. Generally, signal quality may be characterized in various ways, examples of which are discussed above.

If the difference between the current channel quality reported for the particular channel and the maximum channel quality observed for the particular channel is not greater than a threshold difference ("No"), step 702 determines that the channel has sufficient quality for continued usage. The process then returns to step 700 to monitor for changes in signal quality.

If the difference between the current channel quality reported for the particular channel and the maximum channel quality observed for the particular channel is greater than a threshold difference ("Yes"), step 704 decrements a quality value for the particular channel. For instance, when the particular channel is initially assigned, the channel is given a quality value. The quality value, for example, represents a variable that can change based on various conditions and events. Thus, when the difference exceeds the threshold difference, the quality value is decremented by some value.

The following equation provides one example way of decrementing a quality value:

$$\text{Valuenew} = \text{Qualityvalue} - x \qquad \text{Equation 5}$$

In this equation, Valuenew refers to new quality value that is calculated after decrementing a value, Qualityvalue refers to the quality value prior to being decremented, and x represents constant value used to decrement the quality value.

Step 706 determines whether the quality value falls below a threshold quality value. The decremented quality value, for instance, is compared to a threshold quality value. For example, Valuenew from equation 5 is compared to a threshold quality value.

If the quality value does not fall below the threshold quality value ("No"), the method returns to step 700. For instance, the channel continues to be used and quality of the channel is monitored based on quality reports received from the device.

If the quality value falls below the threshold quality value ("Yes"), step 708 replaces the channel. For instance, a different free white space channel is selected, such as using the allocation procedure described above. A CM module 110 then notifies the device using the degraded channel to cease using the channel, and to instead use the different white space channel.

According to various implementations, this procedure is performed dynamically to monitor channel quality and to replace channels whose signal quality has degraded below a threshold signal quality.

Figure 8:
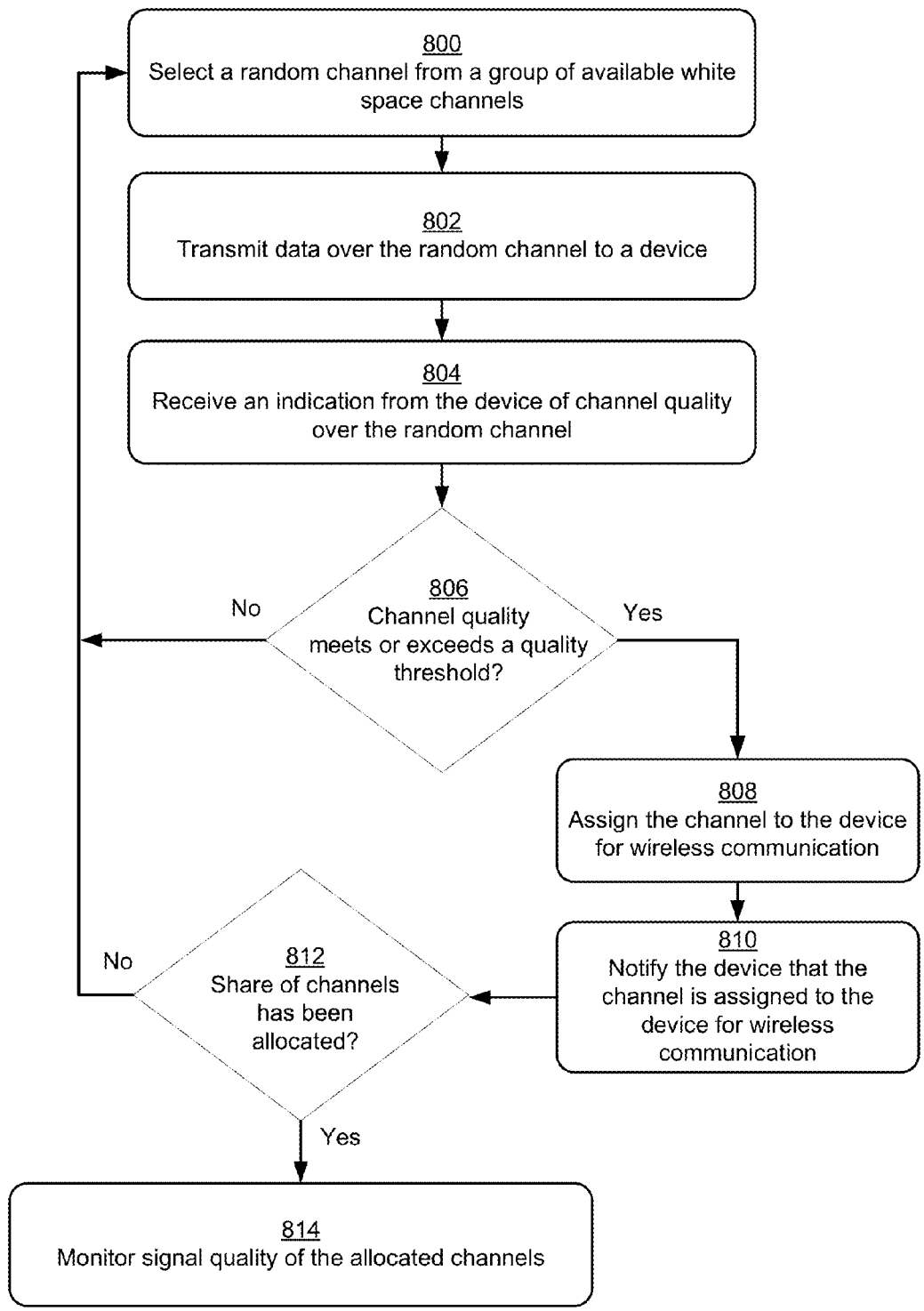
FIG. 8 is a flow diagram that describes steps in a method for a distributed channel selection process in accordance with one or more embodiments.

FIG. 8 is a flow diagram that describes steps in a method in accordance with one or more implementations. The method describes another example distributed channel selection process in accordance with one or more implementations. The method, for instance, represents an example implementation of step 402 discussed above with reference to FIG. 4, and represents an alternative or addition to the process described with reference to FIG. 5.

Step 800 selects a random channel from a group of available white space channels. Ways of identifying available white space channels are discussed above.

Step 802 transmits data over the random channel to a device. A base station 104 that provides wireless service to a particular client device 106, for instance, transmits test data (e.g., test data packets) to the client device 106. In at least some implementations, the base station 104 transmits test data over the random channel to multiple devices to which it provides wireless service, including the particular device.

Step 804 receives an indication from the device of channel quality over the random channel. The device, for instance, determines a signal quality experienced across the channel and base on the data transmitted from the base station. Ways of characterizing channel quality are discussed above. A base station 104 that provides wireless service to a particular client device 106, for instance, receives channel quality information the client device 106. The channel quality information generally described channel quality experienced for the data transmitted from the base station 104. In at least some implementations, the base station 104 receives channel quality information from multiple devices to which it provides wireless service.

Step 806 ascertains whether the channel quality meets or exceeds a quality threshold. In at least some implementations, a predefined quality threshold is specified, such as in reference to one or more of optimal modulation and coding scheme (implied by LTE CQI index), signal-to-noise ratio, packet error rate, packet loss rate, mean opinion score (MOS), and so forth.

If the channel quality meets or exceeds the quality threshold ("Yes"), step 808 assigns the channel to the device for wireless communication. Step 810 notifies the device that the channel is assigned to the device for wireless communication. A particular base station 104, for example, transmits a notification to a particular client device 106 identifying the channel and instructing the client device 106 to utilize the channel for wireless communication.

Step 812 ascertains whether a share of channels has been allocated. For instance, the steps above are performed multiple times to allocate multiple channels. Each time an additional channel is allocated, a total number of allocated channels is compared to a calculated share of channels, e.g., a share calculated for a particular base station 104. One example way of calculating a share is described above at Equation 1. If the share of channels has not been allocated ("No"), the process returns to step 800 to continue allocating channels. For instance, a different random channel is selected and the process is performed using the different random channel. If the share of channels has been allocated ("Yes"), step 814 monitors signal quality of the allocated channels. For instance, the process described above with reference to FIG. 7 is performed for the allocated channels.

Returning to step 806, if the channel quality does not meet the quality threshold ("No"), the process returns to step 800 where a different random channel is selected and the process proceeds using the different random channel.

In at least some implementations, the process described in FIG. 8 is performed in phases either until a particular calculated share of channels is allocated, or up to some maximum number of phases. For instance, at periodic time intervals $T_0$, a particular base station 104 and/or group of base stations 104 executes the process for a duration $\tau$. Further, $\tau$ is segregated into N phases, where each phase has a duration of $$\frac{\tau}{N}.$$

Accordingly, the process is initiated at the start of each phase and is not repeated until the start of a subsequent (e.g., next) phase. In at least some implementations and with reference to step 812 above, if the share of channels has not been allocated ("No") but the process has been repeated for p phases (i.e., a phase threshold), the process can terminate even if the calculated share of channels is not yet allocated. This prevents the process from continuously running if channel conditions prevent a full calculated share of channels from being allocated within p phases.

In implementations where multiple base stations 104 are performing the process, the phases can be synchronized among the base stations 104 such that the base stations compete for channel availability via random channel selection. Thus, techniques encourage a fair allocation of available white space channels, and a more thorough utilization of available channels. For instance, a particular channel may be utilized by more than one base station 104 as long as interference on the channel does not degrade channel quality below a threshold quality, such as described above.

According to various implementations, the processes and procedures may be performed periodically and/or dynamically to calculate channel share and allocate channels. Thus, techniques for distributed selection of white space channels described herein are able to account for changes in a number of devices seeking access to white space channels, and changes in signal quality across white space channels. A more fair allocation and comprehensive usage of channel resources is accordingly realized.

Having discussed some example procedures, consider now a discussion of an example system and device in accordance with one or more embodiments.

Example System and Device

Figure 9:
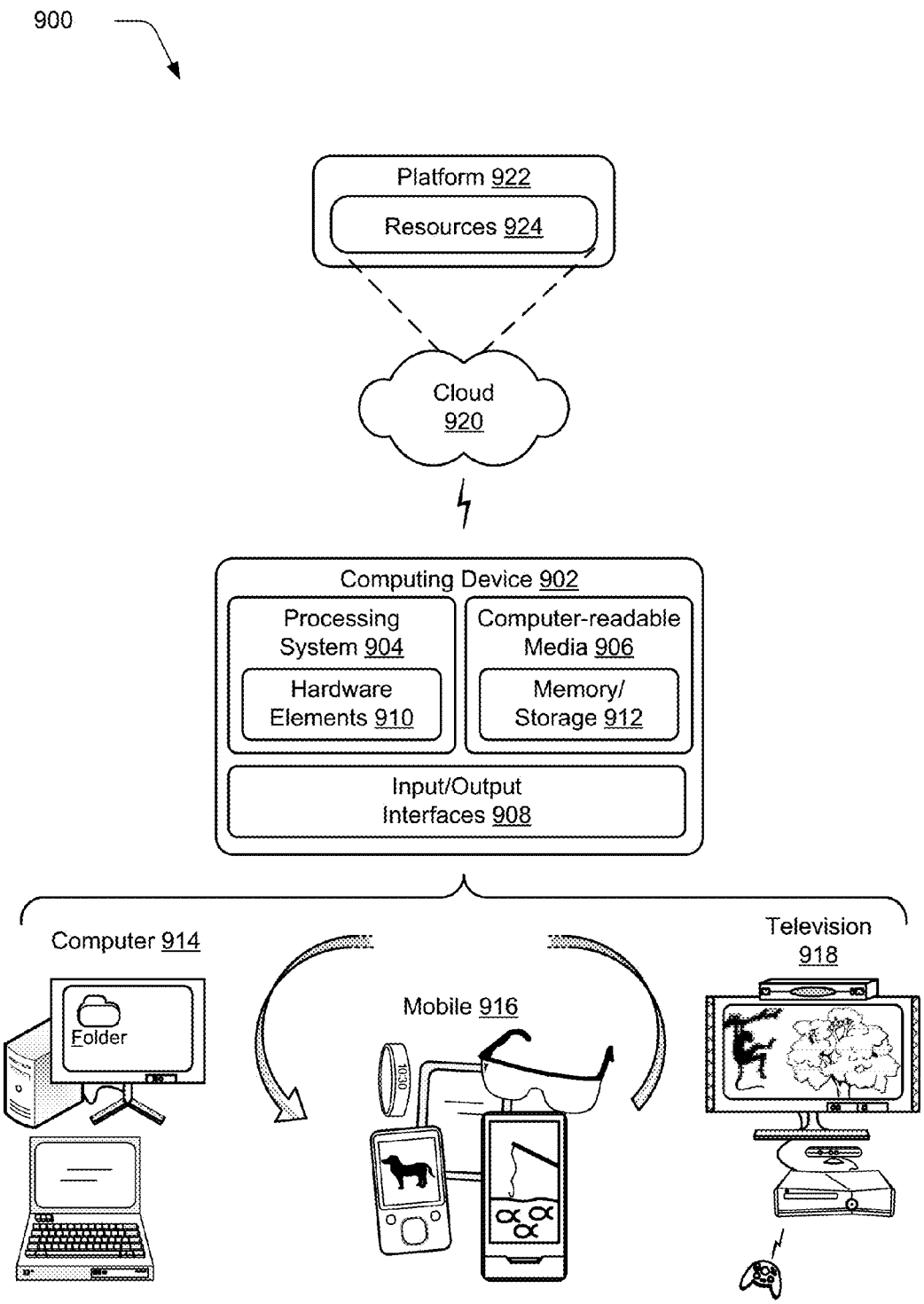
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, various entities and/or components discussed above with reference to FIG. 1 can be embodied as the computing device 902, such as the base stations 104 and/or the client devices 106. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a wearable device, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the base stations 104 and/or the channel manager module 110 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify logic and/or operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for assigning one or more white space channels for wireless communication, the system including: at least one processor; and one or more computer-readable storage media including instructions stored thereon that, responsive to execution by the at least one processor, cause the system perform operations including: ascertaining a share of white space channels from a group of available white space channels based at least in part on a number of devices in a set of devices seeking access to one or more white space channels of the available white space channels, and a number of devices in a subset of devices to which the share of white space channels is to be allocated; and executing logic to perform a distributed channel selection process that assigns subsets of channels from the share of white space channels for use by the subset of devices and based on least in part on channel quality detected in the subsets of channels.

Example 2

A system as described in example 1, further including a base station on which the at least one processor and the one or more computer-readable storage media are implemented, the base station being configured to provide wireless service to the subset of devices.

Example 3

A system as described in one or more of examples 1 or 2, further including a base station on which the at least one processor and the one or more computer-readable storage media are implemented, the base station being configured to provide wireless cellular service to the subset of devices.

Example 4

A system as described in one or more of examples 1-3, further including a base station on which the at least one processor and the one or more computer-readable storage media are implemented, the base station being configured to identify the number of devices in the set of devices based on information received directly from individual devices of the set of devices.

Example 5

A system as described in one or more of examples 1-4, further including a base station on which the at least one processor and the one or more computer-readable storage media are implemented, the base station being configured to identify the number of devices in the set of devices based at least in part on information received from a different base station.

Example 6

A system as described in one or more of examples 1-5, wherein the group of available white space channels includes white space channels that are determined to be free for allocation.

Example 7

A system as described in one or more of examples 1-6, wherein the group of available white space channels includes white space channels that are determined to be free for allocation, and wherein the operations further include identifying a particular white space channel as being a free white space channel by: ascertaining whether a difference between a current channel quality reported for the particular channel and a maximum channel quality observed for the particular channel is less than or equal to a threshold difference; and determining that the particular channel is a free channel in response to ascertaining that the difference between the current channel quality reported for the particular channel and the maximum channel quality observed for the particular channel is less than or equal to the threshold difference.

Example 8

A system as described in one or more of examples 1-7, wherein the operations further include: receiving quality information for the group of white space channels from one or more devices of the subset of devices; and determining that the group of white space channels are free channels based on least on the quality information indicating that a quality of the group of white space channels exceeds a threshold quality.

Example 9

A system as described in one or more of examples 1-8, wherein the operations further include communicating a notification to a device of the subset of devices, the notification identifying one or more channels of the subsets of channels that are assigned to the device.

Example 10

A system as described in one or more of examples 1-9, wherein said executing logic includes: determining free white space channels of the group of available white space channels based on channel quality of the free white space channels; calculating an allocation of the free white space channels for a device of the subset of devices as a function of the share of white space channels, the number of devices in the subset of devices, and a number of the free white space channels; and allocating the allocation of the free white space channels to the device for wireless communication.

Example 11

A system as described in one or more of examples 1-10, wherein said executing logic includes: selecting a random channel from the group of available white space channels; transmitting data over the random channel to a device of the subset of devices; receiving an indication from the device of channel quality over the random channel; determining that the channel quality exceeds a quality threshold; and allocating the channel to the device for wireless communication.

Example 12

A system as described in one or more of examples 1-11, wherein the operations further include: ascertaining whether a difference between a current channel quality reported for a particular channel of the subsets of channels and a maximum channel quality observed for the particular channel is greater than a threshold difference; responsive to ascertaining that the difference between the current channel quality reported for the particular channel and the maximum channel quality observed for the particular channel is greater than the threshold difference, decrementing a quality value for the particular channel; and ascertaining whether to replace the channel based on whether the quality value falls below a threshold quality value.

Example 13

A computer-implemented method for assigning one or more white space channels for wireless communication, the method including: ascertaining a share of white space channels from a group of available white space channels based at least in part on a number of devices in a set of devices seeking access to one or more white space channels of the available white space channels, and a number of devices in a subset of devices to which the share of white space channels is to be allocated; and executing logic to perform a distributed channel selection process that assigns a channel from the share of white space channels for use by a device of the subset of devices, including: determining free white space channels of the group of available white space channels based on channel quality of the free white space channels; calculating an allocation of the free white space channels for the device as a function of the share of white space channels, the number of devices in the subset of devices, and a number of the free white space channels; and allocating the channel from the allocation of the free white space channels to the device for wireless communication.

Example 14

A method as described in example 13, further including identifying the number of devices in the set of devices based on information received directly from the devices.

Example 15

A method as described in one or more of examples 13 or 14, further including providing wireless service for the device via the channel.

Example 16

A method as described in one or more of examples 13-15, further including: instructing the device to send quality information for the channel; receiving quality information for the channel from the device; and determining that the channel is a free white space channel based on the quality information.

Example 17

A computer-implemented method for assigning one or more white space channels for wireless communication, the method including: ascertaining a share of white space channels from a group of available white space channels based at least in part on a number of devices in a set of devices seeking access to one or more white space channels of the available white space channels, and a number of devices in a subset of devices to which the share of white space channels is to be allocated; and executing logic to perform a distributed channel selection process that assigns a channel from the share of white space channels for use by a device of the subset of devices, including: selecting a random channel from the group of available white space channels; transmitting data over the random channel to the device; receiving an indication from the device of channel quality over the random channel; determining that the channel quality exceeds a quality threshold; and allocating the channel to the device for wireless communication.

Example 18

A method as described in example 17, wherein said transmitting includes transmitting data over the random channel to multiple devices including the device, the method further including receiving indications of channel quality over the random channel from the multiple devices.

Example 19

A method as described in one or more of examples 17 or 18, further including performing the distributed channel selection process over multiple different random channels to allocate the multiple different random channels to one or more other devices of the subset of devices.

Example 20

A method as described in one or more of examples 17-19, further including performing the distributed channel selection process over multiple different random channels to allocate the multiple different random channels to one or more other devices of the subset of devices and until the share of white space channels is allocated or the distributed channel selection process is performed a threshold number of times.

Example 21

A computer-implemented method for allocating white spaces for wireless communication, the method including: ascertaining a share of white space channels from a group of available white space channels based at least in part on a number of devices in a set of devices seeking access to one or more white space channels of the available white space channels, and a number of devices in a subset of devices to which the share of white space channels is to be allocated; and executing logic to perform a distributed channel selection process that assigns subsets of channels from the share of white space channels for use by the subset of devices and based on least in part on channel quality detected in the subsets of channels.

Example 22

A method as described in example 21, wherein said executing logic includes: determining free white space channels of the group of available white space channels based on channel quality of the free white space channels; calculating an allocation of the free white space channels for a device of the subset of devices as a function of the share of white space channels, the number of devices in the subset of devices, and a number of the free white space channels; and allocating the allocation of the free white space channels to the device for wireless communication.

Example 23

A method as described in one or more of examples 21 or 22, wherein said executing logic includes: selecting a random channel from the group of available white space channels; transmitting data over the random channel to a device of the subset of devices; receiving an indication from the device of channel quality over the random channel; determining that the channel quality exceeds a quality threshold; and allocating the channel to the device for wireless communication.

CONCLUSION

Techniques for distributed selection of white space channels are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A base station comprising:
at least one processor; and
one or more computer-readable storage media including instructions stored thereon that, responsive to execution by the at least one processor, cause the base station to perform operations including:
ascertaining a total number of devices in a set of devices seeking to access one or more white space channels by analyzing a respective Physical Random Access Channel (PRACH) transmission received directly from each respective device in the set of devices, the total number of devices including:
one or more devices serviced by one or more different base stations than the base station; and
a subset of devices serviced by the base station;
ascertaining a share of white space channels from a group of available white space channels based at least in part on the total number of devices, and a number of the subset of devices; and
executing logic to perform a distributed channel selection process that assigns subsets of channels from the share of white space channels for use by the subset of devices and based on least in part on channel quality detected in the subsets of channels.

2. A base station as recited in claim 1, the base station being configured to provide wireless cellular service to the subset of devices.

3. A base station as recited in claim 1, wherein the group of available white space channels comprises white space channels that are determined to be free for allocation.

4. A base station as recited in claim 1, wherein the group of available white space channels comprises white space channels that are determined to be free for allocation, and wherein the operations further include identifying a particular white space channel as being a free white space channel by:
ascertaining whether a difference between a current channel quality reported for the particular channel and a maximum channel quality observed for the particular channel is less than or equal to a threshold difference; and
determining that the particular channel is a free channel in response to ascertaining that the difference between the current channel quality reported for the particular channel and the maximum channel quality observed for the particular channel is less than or equal to the threshold difference.

5. A base station as recited in claim 1, wherein the operations further include:
receiving quality information for the group of white space channels from one or more devices of the subset of devices; and
determining that the group of white space channels are free channels based on least on the quality information indicating that a quality of the group of white space channels exceeds a threshold quality.

6. A base station as recited in claim 1, wherein the operations further include communicating a notification to a device of the subset of devices, the notification identifying one or more channels of the subsets of channels that are assigned to the device.

7. A base station as recited in claim 1, wherein said executing logic comprises:
determining free white space channels of the group of available white space channels based on channel quality of the free white space channels;
calculating an allocation of the free white space channels for a device of the subset of devices as a function of the share of white space channels, the number of devices in the subset of devices, and a number of the free white space channels; and
allocating the allocation of the free white space channels to the device for wireless communication.

8. A base station as recited in claim 1, wherein said executing logic comprises:
selecting a random channel from the group of available white space channels;
transmitting data over the random channel to a device of the subset of devices;
receiving an indication from the device of channel quality over the random channel;
determining that the channel quality exceeds a quality threshold; and
allocating the channel to the device for wireless communication.

9. A base station as recited in claim 1, wherein the operations further include:
ascertaining whether a difference between a current channel quality reported for a particular channel of the subsets of channels and a maximum channel quality observed for the particular channel is greater than a threshold difference;
responsive to ascertaining that the difference between the current channel quality reported for the particular channel and the maximum channel quality observed for the particular channel is greater than the threshold difference, decrementing a quality value for the particular channel; and ascertaining whether to replace the channel based on whether the quality value falls below a threshold quality value.

10. A base station as recited in claim 1, wherein the one or more one or more different base stations include a base station that is managed by an entity that is different from an entity managing the base station.

11. A base station as recited in claim 1, wherein the operations further include:
periodically performing said ascertaining the total number of devices, said ascertaining the share of white space channels, and said executing logic to perform the distributed channel selection process to determine when to reallocate the one or more white space channels.

12. A base station as recited in claim 11, wherein the operations further include:
determining to reallocate the one or more white space channels based on at least one of:
a change in the total number of devices;
a change in the channel quality; or
a change in an availability of one of the one or more white space channels.

13. A computer-implemented method, comprising:
ascertaining a total number of devices in set of devices seeking to access one or more white space channels, the total number of devices including:
a subset of devices serviced by a first base station; and
one or more other devices serviced by one or more different base stations than the first base station;
ascertaining a share of white space channels from a group of available white space channels based at least in part on the total number of devices, and a number of the subset of devices; and
executing logic to perform a distributed channel selection process that assigns a channel from the share of white space channels for use by a device of the subset of devices, including:
receiving first quality information associated with the white space channels from one or more devices of the subset of devices serviced by the first base station;
receiving second quality information associated with the white space channels from the one or more other devices serviced by the one or more different base stations than the first base station;
determining free white space channels of the group of available white space channels based on channel quality of the free white space channels by avoiding white space channels that are identified in one or more of the first quality information or the second quality information as having poor quality;
calculating an allocation of the free white space channels for the device as a function of the share of white space channels, the number of devices in the subset of devices, and a number of the free white space channels; and
allocating the channel from the allocation of the free white space channels to the device for wireless communication.

14. The method as described in claim 13, further comprising identifying the number of devices in the set of devices based on information received directly from the devices.

15. The method as described in claim 13, further comprising providing wireless service for the device via the channel.

16. The method as described in claim 13, further including: sharing the quality information from the one or more devices serviced by the first base station with at least one of the one or more different base stations.

17. A computer-implemented method, comprising:
ascertaining a total number of devices in a set of devices seeking to access one or more white space channels by analyzing a respective Physical Random Access Channel (PRACH) transmission received directly from each respective device in the set of devices, the total number of devices including:
a subset of devices serviced by a first base station; and
one or more devices serviced by one or more different base stations than the first base station;
ascertaining a share of white space channels from a group of available white space channels based at least in part on the total number of devices in the set of devices seeking access to the one or more white space channels, and a number of the subset of devices; and
executing logic to perform a distributed channel selection process that assigns a channel from the share of white space channels for use by a device of the subset of devices, including:
selecting a random channel from the group of available white space channels;
transmitting data over the random channel to the device;
receiving an indication from the device of channel quality over the random channel;
determining that the channel quality exceeds a quality threshold; and
allocating the channel to the device for wireless communication.

18. A method as described in claim 17, wherein said transmitting comprises transmitting data over the random channel to multiple devices including the device, the method further comprising receiving indications of channel quality over the random channel from the multiple devices.

19. A method as described in claim 17, further comprising performing the distributed channel selection process over multiple different random channels to allocate the multiple different random channels to one or more other devices of the subset of devices.

20. A method as described in claim 17, further comprising performing the distributed channel selection process over multiple different random channels to allocate the multiple different random channels to one or more other devices of the subset of devices and until the share of white space channels is allocated or the distributed channel selection process is performed a threshold number of times.

* * * * *